(12) United States Patent
Zhou et al.

(10) Patent No.: US 9,876,964 B2
(45) Date of Patent: Jan. 23, 2018

(54) VIDEO CODING WITH COMPOSITION AND QUALITY ADAPTATION BASED ON DEPTH DERIVATIONS

(71) Applicant: Apple Inc., Cupertino, CA (US)

(72) Inventors: Xiaosong Zhou, Campbell, CA (US); Hsi-Jung Wu, San Jose, CA (US); Chris Y. Chung, Sunnyvale, CA (US); James O. Normile, Los Altos, CA (US); Dazhong Zhang, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 260 days.

(21) Appl. No.: 14/290,351

(22) Filed: May 29, 2014

(65) Prior Publication Data
US 2015/0350560 A1    Dec. 3, 2015

(51) Int. Cl.
*H04N 7/12* (2006.01)
*H04N 5/262* (2006.01)
*H04N 19/167* (2014.01)
*H04N 19/132* (2014.01)
*H04N 19/115* (2014.01)
*H04N 19/17* (2014.01)
*H04N 19/124* (2014.01)
*H04N 19/136* (2014.01)

(52) U.S. Cl.
CPC ........... *H04N 5/262* (2013.01); *H04N 19/115* (2014.11); *H04N 19/124* (2014.11); *H04N 19/132* (2014.11); *H04N 19/136* (2014.11); *H04N 19/167* (2014.11); *H04N 19/17* (2014.11)

(58) Field of Classification Search
CPC ....................................................... H04N 5/262
USPC ....................................................... 375/240.1
See application file for complete search history.

(56) References Cited

U.S. PATENT DOCUMENTS 6,055,330 A * 4/2000 Eleftheriadis ........... G06T 9/007
                                                                 382/154
6,301,385 B1   10/2001 Chen et al.
7,302,096 B2   11/2007 Kim
(Continued)

FOREIGN PATENT DOCUMENTS

KR    2004-0049425 A    6/2004

OTHER PUBLICATIONS

International Search Report and Written Opinion, dated Jul. 17, 2015, from corresponding International Application No. PCT/US2015/032046, filed May 21, 2015.
(Continued)

*Primary Examiner* — Richard Torrente
(74) *Attorney, Agent, or Firm* — Baker Hostetler LLP; Robert L. Hails (57) ABSTRACT

Techniques for coding video data estimate depths of different elements within video content and identify regions within the video content based on the estimated depths. One of the regions may be assigned as an area of interest. Thereafter, video content of a region that is not an area of interest may be masked out and the resultant video content obtained from the masking may be coded. The coded video content may be transmitted to a channel. These techniques permit a coding terminal to mask out captured video content prior to coding in order to support coding policies that account for privacy interests or video composition features during a video coding session.

20 Claims, 5 Drawing Sheets

(56) References Cited

U.S. PATENT DOCUMENTS

| | | |
|---|---|---|
| 2004/0028130 A1* | 2/2004 | May .................. H04N 19/61 |
| | | 375/240.08 |
| 2006/0017835 A1 | 1/2006 | Jacobsen |
| 2006/0215014 A1 | 9/2006 | Cohen et al. |
| 2008/0013786 A1* | 1/2008 | Lin .................. G06K 9/0057 |
| | | 382/103 |
| 2008/0080779 A1* | 4/2008 | Nakanishi ............ H04N 19/139 |
| | | 382/236 |
| 2009/0010328 A1 | 1/2009 | Pan et al. |
| 2011/0050944 A1* | 3/2011 | Nakamura ............ H04N 5/772 |
| | | 348/222.1 |
| 2012/0007939 A1 | 1/2012 | Michrowski et al. |
| 2012/0087573 A1 | 4/2012 | Sharma et al. |
| 2012/0281132 A1* | 11/2012 | Ogura ................ H04N 5/23212 |
| | | 348/348 |
| 2013/0169760 A1* | 7/2013 | Watts .................. G06K 9/40 |
| | | 348/47 |

OTHER PUBLICATIONS

International Patent Application No. PCT/US2015/032046; Int'l Preliminary Report on Patentability; dated Dec. 8, 2006; 9 pages.

* cited by examiner

VIDEO CODING WITH COMPOSITION AND QUALITY ADAPTATION BASED ON DEPTH DERIVATIONS

BACKGROUND

Embodiments of the present invention relate to video coding and, in particular, to masking of video content prior to such coding.

Many modern consumer electronics support video coding processes in which electronic devices capture, code and transmit image information of a local environment. While such applications are convenient, in some applications, the electronics capture too much information. Such devices do not provide to operators a convenient mechanism to redact or mask out unwanted image content. To maintain a desired degree of privacy, operators often have to constrain the amount of image information that is captured by their devices. Otherwise, those devices typically code all image data that is input to it.

The inventors recognize a need in the art for a device that dynamically distinguishes different elements of image content within a video sequence and masks out elements that are unwanted. No known system provides such functionality.

DETAILED DESCRIPTION

Embodiments of the present invention provide techniques for coding video data in which depths of different elements within video content are estimated and regions within the video content are identified based on the estimated depths. One of the regions may be assigned as an area of interest. Thereafter, video content of a region that is not an area of interest may be masked out and the resultant video content obtained from the masking may be coded. The coded video content may be transmitted to a channel. These techniques permit a coding terminal to mask out captured video content prior to coding in order to support coding policies that account for privacy interests or video composition features during a video coding session.

Figure 1:
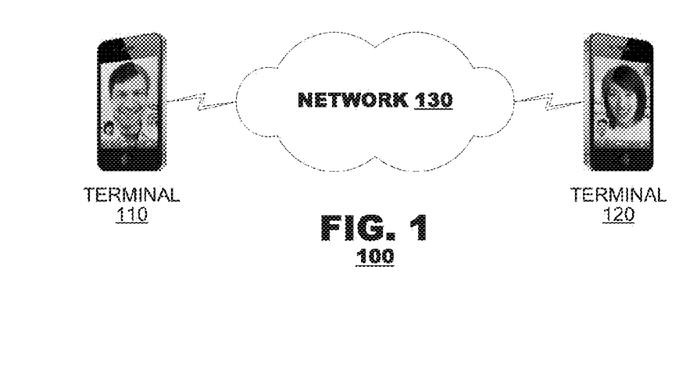
FIG. 1 is a simplified block diagram of an encoder/decoder system according to an embodiment of the present invention.

FIG. 1 is a simplified block diagram of an encoder/decoder system 100 according to an embodiment of the present invention. The system 100 may include first and second terminals 110, 120 interconnected by a network 130.

The terminals 110, 120 may exchange coded video data with each other via the network 130, either in a unidirectional or bidirectional exchange. For unidirectional exchange, a first terminal 110 may capture video data from local image content, code it and transmit the coded video data to a second terminal 120. The second terminal 120 may decode the coded video data that it receives and display the decoded video at a local display. For bidirectional exchange, each terminal 110, 120 may capture video data locally, code it and transmit the coded video data to the other terminal. Each terminal 110, 120 also may decode the coded video data that it receives from the other terminal and display it for local viewing.

Although the terminals 110, 120 are illustrated as smartphones in FIG. 1, they may be provided as a variety of computing platforms, including servers, personal computers, laptop computers, tablet computers, media players and/or dedicated video conferencing equipment. The network 130 represents any number of networks that convey coded video data among the terminal 110 and terminal 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless discussed hereinbelow.

Figure 2:
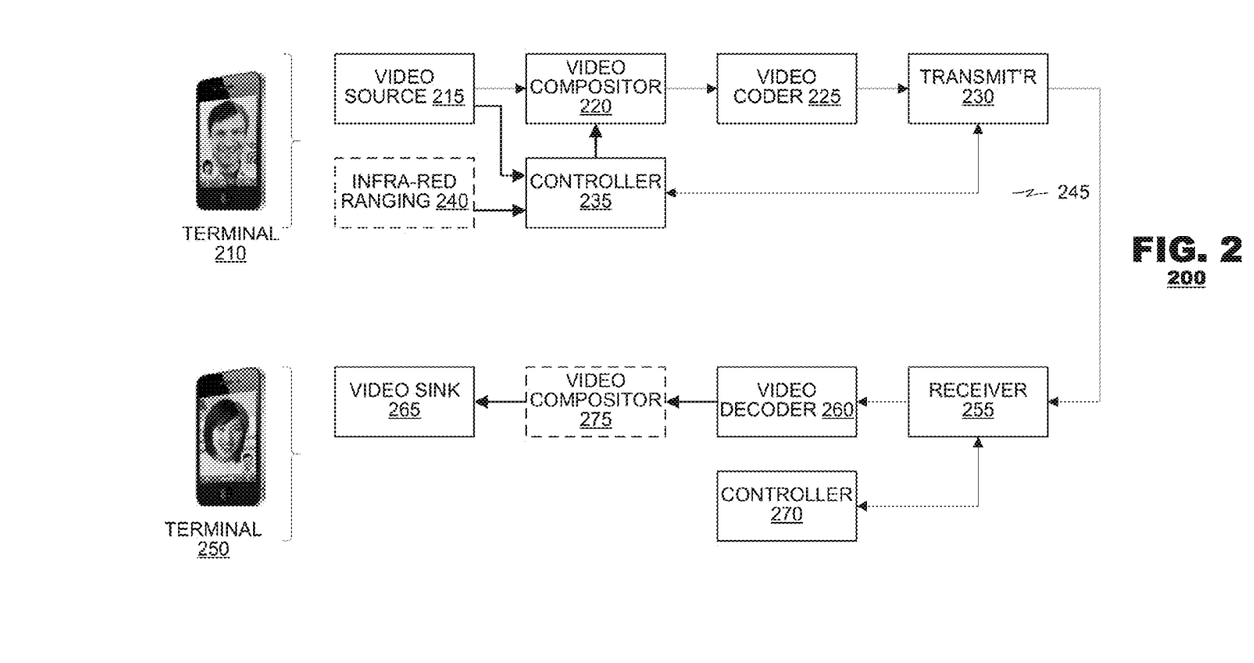
FIG. 2 is a functional block diagram of an encoder/decoder system according to an embodiment of the present invention.

FIG. 2 is a functional block diagram of a terminal 210 that performs video coding according to an embodiment of the present invention. The terminal 210 may include a video source 215, a video compositor 220, a video coder 225, a transmitter 230 and a controller 235. The video source 215 may generate a video sequence for coding. The video compositor 220 may perform masking operations that delete or replace selected portions of content from the video sequence. The video coder 225 may perform data compression operations to reduce the bitrate of the video sequence output from the video compositor 220. The transmitter 230 may transmit coded video data to another terminal 250 via a channel 245 provided by a network. The controller 235 may coordinate operation of the terminal 210 as it performs these functions.

Typical video sources 215 include electronic cameras that generate video from locally-captured image information and/or storage devices in which video may be stored, e.g., for media serving applications. Thus, source video sequences may represent naturally occurring image content or synthetically generated image content (e.g., computer generated video) as application needs warrant. The video source may provide source video to other components within the terminal 210.

A video compositor 220 may alter the video sequence input to it prior to coding. The video compositor 220, for example, may discriminate content elements within the video and may mask out certain elements prior to coding. The video compositor 220 may delete the selected elements or may replace them with other content. The video compositor 220 may output a resultant video sequence to the video coder 225.

The video coder 225 may code frames of video data to reduce bandwidth of the source video. In an embodiment, the video coder 225 may perform pre-processing, content prediction and coding. Pre-processing operations typically condition a video sequence for subsequent coding. Typical pre-processing may include filtering operations that alter the spatial and/or temporal complexity of the source video, resizing operations that alter the size of frames within the source video and frame rate conversion operations that alter the frame rate of the source video. Such pre-processing operations also may vary dynamically according to operating states of the terminal 210, operating states of the network 130 (FIG. 1) and/or operating states of a second terminal 250 that receives coded video from the first terminal 210. In some operating states, pre-processing may be disabled, in which case, the prediction and coding may be performed on video data output by the video compositor 220 without alteration.

Prediction and coding operations may reduce the bandwidth of the video sequence by exploiting redundancies in the source video's content. For example, coding may use content of one or more previously-coded "reference frames" to predict content for a new frame to be coded. Such coding may identify the reference frame(s) as a source of prediction in the coded video data and may provide supplementary "residual" data to improve image quality obtained by the prediction. Coding may operate according to any of a number of different coding protocols, including, for example, MPEG-4, H.263, H.264 and/or HEVC. Each protocol defines its own basis for defining pixel blocks and the principles of the present invention may be used cooperatively with these approaches.

The coding operations may include a local decoding of coded reference frame data. Many predictive coding operations are lossy operations, which causes decoded video data to vary from the source video data in some manner. By decoding the coded reference frames, the terminal 210 stores a copy of the reference frames as they will be recovered by the second terminal 250.

The transmitter 230 may format the coded video data for transmission to another terminal. Again, the coding protocols typically define a syntax for exchange of video data among the different terminals. Additionally, the transmitter 230 may package the coded video data into packets or other data constructs as may be required by the network. Once the transmitter 230 packages the coded video data appropriately, it may release the coded video data to the network 130 (FIG. 1).

The video coder 225 may select various coding parameters based on constraints that may be imposed upon it by a controller 235. For example, the video coder 225 may select coding modes for frames and pixel blocks (for example, selection among inter-coding and intra-coding), quantization parameters and other coding parameters for various portions of the video sequence. The controller 235 may impose constraints on the video coder 225 by selecting, for example, a target bit rate that the coded video must meet, a metric of image quality that must be met when the coded video is decoded. In this manner, the elements of the video coder 225 operate cooperatively with the controller 235.

Optionally, the first terminal 210 may include other components that assist to estimate depth of elements within video content. For example, the first terminal 210 may include an infra-red transceiver 240 that may be utilized to perform ranging operations by the first terminal 210.

The first terminal 210 also may include various sensors (not shown) for capture of user commands and other data. Such sensors may include user input elements to detect input of user commands. For example, the terminal 210 may possess buttons, a touch screen sensor, fingerprint sensors, infra-red ranging sensors, and/or microphones from which to detect user commands. Users may engage buttons to enter designated commands. They may interact with graphical user elements on a touch screen to engage virtual buttons. In other embodiments, users may enter spoken commands to the terminal 210 via a microphone. Other sensors may include motion sensors that generate data from the terminal's orientation in free space.

FIG. 2 also illustrates functional units of a second terminal 250 that decodes coded video data according to an embodiment of the present invention. The terminal 250 may include a receiver 255, a video decoder 260, a video sink 265 and a controller 270. The receiver 255 may receive coded video data from the channel 245 and provide it to the video decoder 260. The video decoder 260 may invert coding operations applied by the first terminal's video coder 225 and may generate recovered video data therefrom. The video sink 265 may render the recovered video data. The controller 270 may manage operations of the terminal 250.

As indicated, the receiver 255 may receive coded video data from a channel. The coded video data may be included with channel data representing other content, such as coded audio data and other metadata. The receiver 255 may parse the channel data into its constituent data streams and may pass the data streams to respective decoders (not shown), including the video decoder 260.

The video decoder 260 may generate recovered video data from the coded video data. The video decoder 260 may perform prediction and decoding processes. For example, such processes may include entropy decoding, re-quantization and inverse transform operations that may have been applied by the encoding terminal 210. The video decoder 260 may build a reference picture cache to store recovered video data of the reference frames. Prediction processes may retrieve data from the reference picture cache to use for predictive decoding operations for later-received coded frames. The coded video data may include motion vectors or other identifiers that identify locations within previously-stored references frames that are prediction references for subsequently-received coded video data. Decoding operations may operate according to the coding protocol applied by the video coder 225 and may comply with MPEG-4, H.263, H.264 and/or HEVC.

The video sink 265 represents units within the second terminal 250 that may consume recovered video data. In an embodiment, the video sink 265 may be a display device. In other embodiments, however, the video sink 265 may be provided by applications that execute on the second terminal 250 that consume video data. Such applications may include, for example, video games and video authoring applications (e.g., editors).

Optionally, a second terminal 250 may include a video compositor 275 that alters recovered video data output by a video decoder 260. Such embodiments are described hereinbelow.

FIG. 2 illustrates functional units that may be provided to support unidirectional transmission of video from a first terminal 210 to a second terminal 250. In many video coding applications, bidirectional transmission of video may be warranted. The principles of the present invention may accommodate such applications by replicating the functional units 215-240 within the second terminal 250 and replicating the functional units 255-275 within the first terminal 210. Such functional units are not illustrated in FIG. 2 for convenience.

Figure 3:
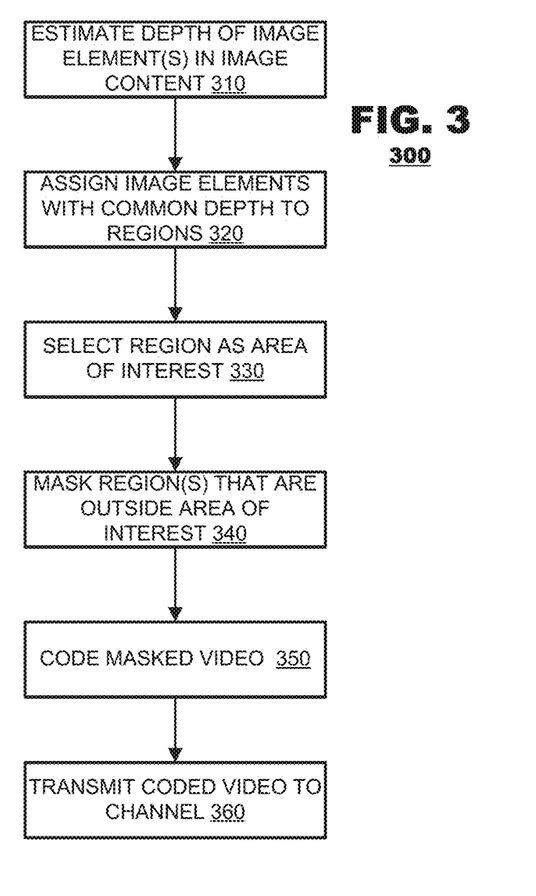
FIG. 3 illustrates a method according to an embodiment of the present invention.

FIG. 3 illustrates a method 300 according to an embodiment of the present invention. The method 300 may operate on video data that is to be coded for transmission to another device. The method 300 may estimate a depth of different elements of image content in the video data (box 310) and may assign elements with common depth to belong to common regions of the video data (box 320). The method 300 may assign one of the elements to be an area of interest (box 330) and may mask other regions, regions that lie outside the area of interest (box 340). Thereafter, the method 300 may cause the resulting masked video data to be coded (box 350) and may transmit the coded video to a channel (box 360).

Estimation of depth and assignment of regions may occur in a variety of ways. In a simple example, the method 300 may leverage auto-focus operations that are performed by cameras. Typically, such cameras generate video output in which a portion of the image content (typically, a foreground element) is provided in focus and other portions of image content (say, a background element) may not be in focus. In such an implementation, a method may estimate which portions of the image content are in focus and which are not and assign the focused elements to a first region, and the unfocused region to a second region. The second region may be masked out prior to coding.

In other embodiments, the method 300 may leverage output of face detection processes within a terminal. Such processes may search image content for features that represent human faces. Those processes typically generate data that identifies the number of faces detected within image content and positions of each detected face, often by coordinates identifying positions within frames where the facial features were detected. In such embodiments, the method 300 may estimate a depth of each face within the image content, for example, through derivation from camera settings and/or an analysis of image content. Image content analyses may include an estimation of the size of an identified face within image content and/or an estimation of a degree to which each face is in focus or out of focus.

Facial detection processes often identify only positions of predetermined facial features within image content, for example, a subject's eyes, nose and mouth. In such embodiments, the method 300 may estimate the depth of each face in the image content based on the size of each face within the image content. Facial recognition processes may identify a rectangle within the image content in which the operator's facial features were detected. From this rectangle, the method may add other portions of the image content until a complete region is identified. Thus, the area occupied by the face rectangle may provide an indicator of the depth of the face within the image content.

Other embodiments of the present invention may perform search operations within image content to expand the regions identifies by the face detection process to include other image elements that are associated with the detected face. One such example is illustrated in FIG. 4, where image content may include video of an operator 410 and background elements such as a window 420.

Image content may be parsed into a plurality of pixel blocks. In the example illustrated in FIG. 4, the image content is shown as being parsed into pixel blocks of different sizes—large pixel blocks LRG, medium-sized pixel blocks MED and small-sized pixel blocks SM—based on complexity of the image content. Image content that has relatively low spatial complexity may be parsed into large pixel blocks. For portions of image content that have higher spatial complexity, the large pixel blocks may be parsed into smaller-sized pixel blocks (shown as medium and small, respectively) for processing purposes. In this example, large pixel blocks are parsed into 2×2 arrays of medium-sized pixel blocks (when they are to be parsed). Similarly, medium sized pixel blocks are shown as being parsed into 2×2 arrays of small pixel blocks. The principles of the present invention may be used with processing systems that parse image content into pixel blocks according to other schemes—for example, into non-overlapping sets of pixel blocks or pixel blocks having rectangular shapes (rather than square shapes as illustrated).

When a face detection process identifies the location 430 of a face within image content, the method may estimate which other elements of image content are at a common depth with the face. The derivation may be performed from an analysis of the image content itself, for example, to identify image content that is adjacent to the identified face that may have similar color content with content in the identified face location 430; image content that exhibits a similar level of focus as the identified face location; and/or exhibit motion properties as content in the identified face location 430. Alternatively, the estimation may be performed from data supplied from an image capture device that may identify regions that are in focus; the method may estimate from the image capture device whether regions adjacent to the identified face location 430 also are in focus.

Figure 4:
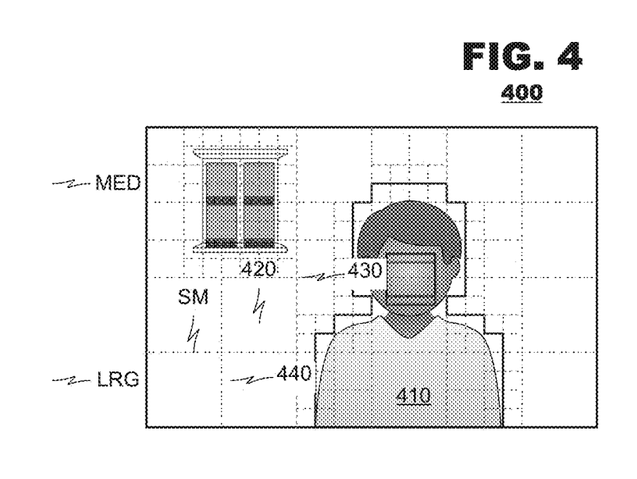
FIG. 4 illustrates an exemplary frame of video content.

As illustrated in FIG. 4, when image content is identified that is adjacent to the identified face location and is estimated to be at a common depth as content of the identified face location, the image content may be designated as a region 440 for further processing.

In an embodiment, coding of video (box 350) may be altered according to estimated depth of image content. For example, an encoder may adjust coding parameters such as frame resolution, frame rate or bit rate assigned to regions of interest. If, for example, content of a region of interest is estimated to be relatively close in a field of view, an encoder may reduce a frame rate of content in the region of interest in favor of retaining frame resolution. In this way, frames may be dropped from the source video and bandwidth that otherwise would be spent coding dropped frames can be spent on coding of the region of interest at higher resolution in the remaining frames. On the other hand, if content of a region of interest is estimated to be relatively distant, an encoder may choose to reduce resolution of the region of interest and keep frame rate at a relatively high rate.

In another embodiment, depth information may be used to control camera exposure settings at a video source 215 (FIG. 2). Whereas some exposure control systems estimate exposure levels of content within an identified face rectangle, embodiments of the present invention may estimate exposure levels across an entire region of interest. Such embodiments may contribute to improvements in image quality particularly in coding applications where a high level of contrast exists between content in the face rectangle and content in the remainder of a region of interest.

Depth information also may be used to control digital zoom functions within an encoding terminal. As part of the masking (box 340), the encoding terminal may perform editing functions to position and scale content of the region of interest within the frame being coded. In this manner, the encoding terminal may set the region of interest within the frame to improve composition of the coded frame.

Additionally, use of depth information permits other composition features as well. In another embodiment, image content may be added to a region of interest. Such image content may include graphical annotations (e.g., icons, images, rotating objects and the like) that may be added to video content under user control. As part of these composition operations, an encoding terminal may use depth information to scale, position and/or set 3D perspective to the added graphical annotations within the region of interest.

In a further embodiment, depth information may be employed during prediction searches used in coding operations. For example, when depths are assigned to identified regions, the depths may be tracked from frame to frame in a source video sequence. Moreover, depth information may be stored in for regions assigned to reference frames from which prediction candidates may be derived. Thus, during coding, a video coder 225 (FIG. 2) may use depth information assigned to video content that is being coded to search among stored reference picture data for video content whose estimated depth matches estimated depth of the new video content. The video coder 225 may search among matching region(s) of stored reference picture(s) for video content that provides a suitable prediction of the new content. In this way, use of depth information may conserve resources that otherwise might be spent on a wide ranging search, without benefits of the depth information.

Figures 5, 6:
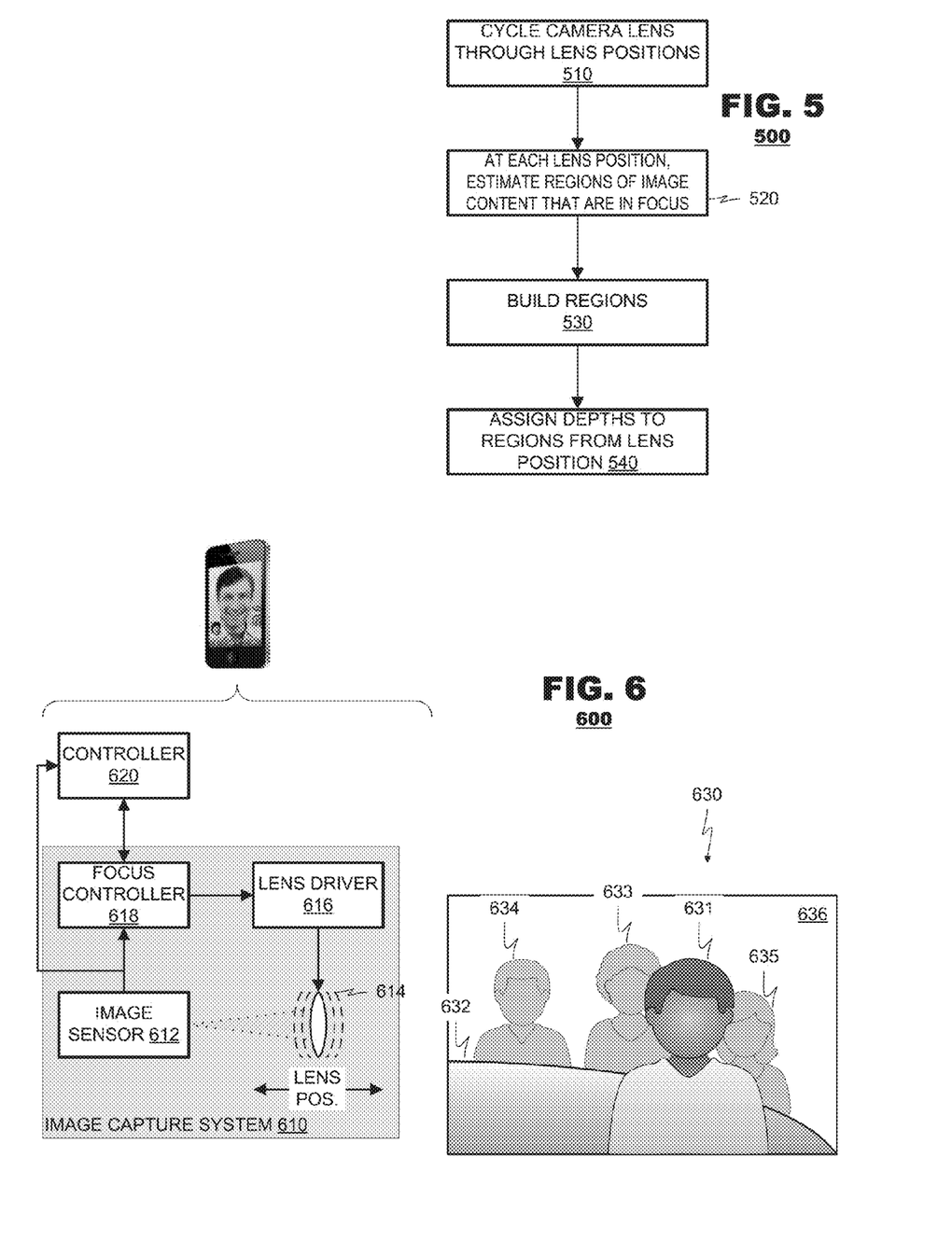
FIG. 5 illustrates a method according to another embodiment of the present invention.
FIG. 6 illustrates components of a terminal for use in depth estimation according to an embodiment of the present invention.

FIG. 5 illustrates a method of identifying regions of depth according to another embodiment of the present invention. The method 500 may control focusing operations of an image capture system to identify regions of depth. The method 500 may iteratively cycle the image capture system through a plurality of different lens positions and may capture image information at each position (box 510). The method 500 may analyze image content to identify regions within the image content that are in focus at each lens position and which regions are out of focus (box 520). The method 500 may build regions from portions of image content that are deemed in focus at a given lens position (box 530). The method also may assign to the region a depth that corresponds to the lens's position at the time of image capture.

FIG. 6 illustrates components of a terminal 600 that may estimate depth of regions within image content according to an embodiment of the present invention. The terminal 600 may include an image capture system 610 and a controller 620. The image capture system 610 may include an image sensor 612, a lens 614, lens driver 616 and a focus controller 618.

During operation, the controller 620 may control the image capture system 610 (and lens driver 616) to cycle the lens 614 through a variety of lens positions. The image sensor 612 may capture image data at each of the lens positions and output the image data to the focus controller 618 and to the controller 620. The controller 620 may estimate which elements of image content are in focus at each lens position.

FIG. 6 also illustrates an exemplary frame 630 of image data that includes various image elements 631-636 therein at various depths. Different image elements may occur in focus at different lens positions. For example, image data of a person 631 in a foreground may come into focus at a first lens position. Image data of other people 634-635 may be placed in focus at another (possibly many other) lens positions. Image data of background elements 636 may be placed in focus at still another lens position. A controller 620 may estimate which elements are in focus and which are not by, for example, estimating spatial complexity of different areas of a frame, performing edge detection, and/or performing facial recognition operations upon such image data. Moreover, the controller 620 may compare its estimates for the different areas of the images at the different lens positions to estimate which locations are in focus and which are not.

The method of FIG. 5 may be performed periodically, if desired, to refine estimates of depth of image elements during a video coding session.

In another embodiment, the method of FIG. 5 may be performed once during initialization of an image session. Thereafter, a controller 620 may track movement of regions by analyzing motion of image content during a coding session. Typically, a focus controller 618 may perform auto-focus operations to keep a foreground image content in focus. The controller 620 may perform running analyses of other regions of image content and revise its initial estimates of depth if the controller 620 determines that content in those other regions are coming into focus or becoming sharper (as determined, for example, by edge detection processes or spatial complexity analyses).

A coding terminal may employ a variety of techniques to assign regions to an area of interest. In a simple case, a region that is identified as being a foreground region, for example, because it is the largest region in a frame or because it is identified as having the smallest depth, may be identified as an area of interest.

Alternatively, a region may be identified as the area of interest based on ancillary content associated with the image. In one example, a terminal may assign a region to be the area of interest through speaker recognition—it may attempt to associate captured audio with a detected region by, for example, identifying movement in a speaker's lips that is associated with the captured audio. In this embodiment, the region that is occupied by the speaker may be designated as the area of interest and masking may be applied to other regions of image content.

In another example, which may arise in a video conferencing application, a coding terminal may have an array of speakers provided to capture speech. In such an embodiment, the coding terminal may estimate a location of a speaker through directional estimates (e.g., the speech is input from a speaker on the left of the image content or the right side of image content). A region may be designated as an area of interest from the directional estimates.

Moreover, an encoding terminal may use depth information assigned to regions to modulate gain among an array of microphones that capture audio information during video capture. In such an embodiment, the encoding terminal may store data that correlate individual microphones with estimated levels of depth and, optionally, location in a field of video. When a speaker is identified, an encoding terminal may estimate which microphone(s) in the array are closest to the speaker. The encoding terminal may modulate the gain of the microphones by increasing gain of those identified as closest to the speaker and decreasing gain of those farther away from the speaker.

Masking of other regions also may occur in a variety of ways. In a first embodiment, image content from other regions may be replaced by dummy image content that is efficient to code by the video coder. For example, the image content may be uniform gray scale content or content of limited spatial complexity.

Alternatively, the image content may represent predetermined image content that is known to the encoding terminal and the decoding terminal. For example, the encoding terminal may code a background element at an earlier stage of a video coding session and transmit the coded background element to the decoding terminal. The encoding terminal and decoding terminal both may store the background element in a predetermined cache for later reference. When masking data of non-selected regions, the encoding terminal may generate masked data for those regions from the pre-coded background element and may transmit control commands to the decoding terminal that reference the pre-coded background element. In this way, the encoding terminal and decoding terminal are not limited in the range of information that can be used for composition of image data in the masked regions.

Masking also can include application of depth of field effects. For example, regions outside the area of interest may be subject to blur filtering (Gaussian filtering or the like) to reduce clarity of content in those regions. The regions may be subject to video adjustments that reduce brightness of content in those regions or flatten color in those regions. Further they may be subject to depth of field zoom effects, which may enhance the visual impact of content in the area of interest.

Figure 7:
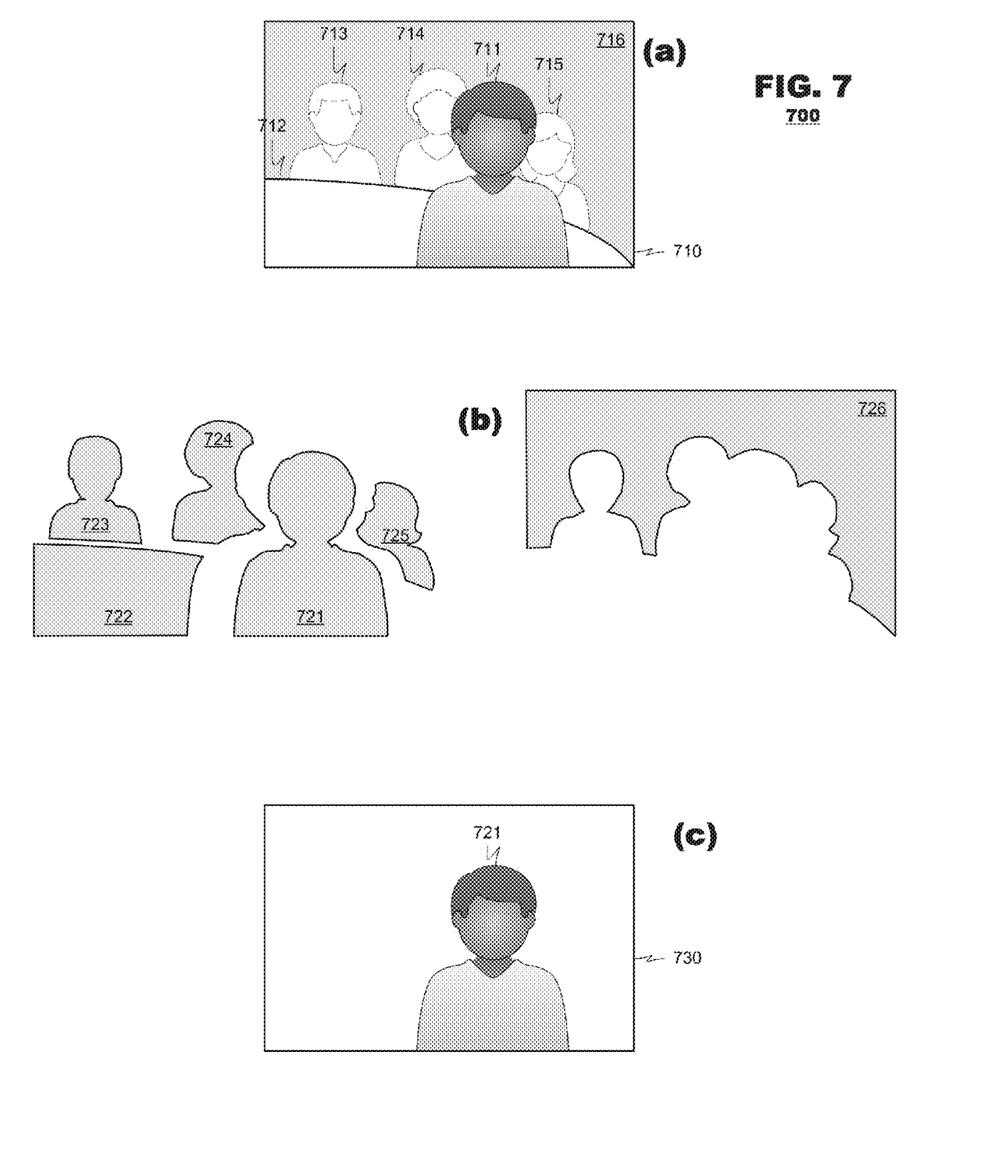
FIG. 7 illustrates an exemplary frame of video content.

FIG. 7 illustrates an exemplary frame 710 in which masking may be applied. Shown in FIG. 7(a), the frame 710 includes various image elements 711-716 therein at various depths. When the image content of the frame 710 is estimated according to one of the foregoing methods, a variety of regions 721-726 may be identified, as shown in FIG. 7(b). The region 721 may be identified as an area of interest and the remainder of the regions may be masked. FIG. 7(c) illustrates a resultant frame 730 in which content of region 721 is persistent but content of the other regions 722-726 have been masked by other content or otherwise hidden from the field of view.

In another embodiment, a video coder 225 (FIG. 2) may be controlled to alter its allocation of resources for coding image content within the area of interest and for coding image content outside the area of interest. Video coders 225 typically operate according to bit budgets, which define the bandwidth that has been allocated for coded video data and, from those bit budgets, the video coders often derive targets for coded frames. The targets may vary based on a coding type that is assigned to each frame and other operational parameters. According to an embodiment of the present invention, when a controller 235 identifies regions of frames as areas of interest for coding, a video coder 225 may tailor its coding processes to allocate greater numbers of bits to the areas of interest at the expense of bits that are allocated to other regions (the masked regions). For example, a video coder 225 may alter assignments of quantization parameters, which are applied to transform coefficients obtained from image content on a pixel-block-by-pixel-block basis. In this example, a video coder 225 may lower, from a default assignment scheme, quantization parameters for pixel blocks that are included within an area of interest and it may increase, from the default, quantization parameters that would be applied to pixel blocks outside the area of interests. In this manner, coding quality may be improved for the image content within an area of interest at the expense of coding quality outside the area of interest.

In another embodiment, an encoding terminal may provide metadata in a coded bit stream that identifies a location of an area of interest. A decoding terminal may use the location data to alter its decoding and/or rendering processes.

Figure 8:
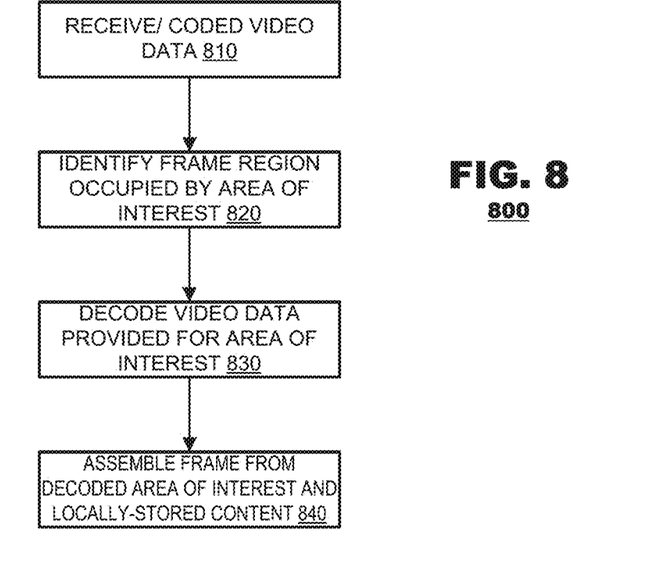
FIG. 8 illustrates a method according to an embodiment of the present invention.

FIG. 8 illustrates a method 800 according to an embodiment of the present invention. According to the method 800, a decoding terminal may receive coded video data of a frame (box 810). The coded video data may include an identifier of an area of interest within the frame. The method 800 may search within the coded video and identify frame region for coded data representing content of the area of interest (box 820) and may decode that data to the exclusion of coded data representing other areas of the frame (box 830). Thereafter, the method 800 may assemble frame data from decoded data representing the area of interest and from other content locally stored by the decoding terminal (box 840). The method 800 may render the assembled frame either by displaying at on a display of the decoding terminal or by storing it for use by other applications resident at the decoding terminal.

The method 800 of FIG. 8 permits a decoding terminal to selectively mask and unmask portions of a frame based on area of interest identifiers. Such operations may find applications in decoding terminals that support application-oriented manipulation of content, for example, games or authoring applications on terminals. They also may work in tandem with rendering features that highlight frame content, for example, by speakers, detected objects or detected faces.

Depth information also may be used to control digital zoom functions within an decoding terminal. As part of its operation, the decoding terminal may perform editing functions to position and scale content of the region of interest within the frame being coded. In this manner, the decoding terminal may set the region of interest within the frame to improve composition of the rendered frame.

Additionally, use of depth information permits other composition features as well. In another embodiment, image content may be added to a region of interest. Such image content may include graphical annotations (e.g., icons, images, rotating objects and the like) that may be added to video content under user control. As part of these composition operations, a decoding terminal may use depth information to scale, position and/or set 3D perspective to the added graphical annotations within the region of interest.

Figure 9:
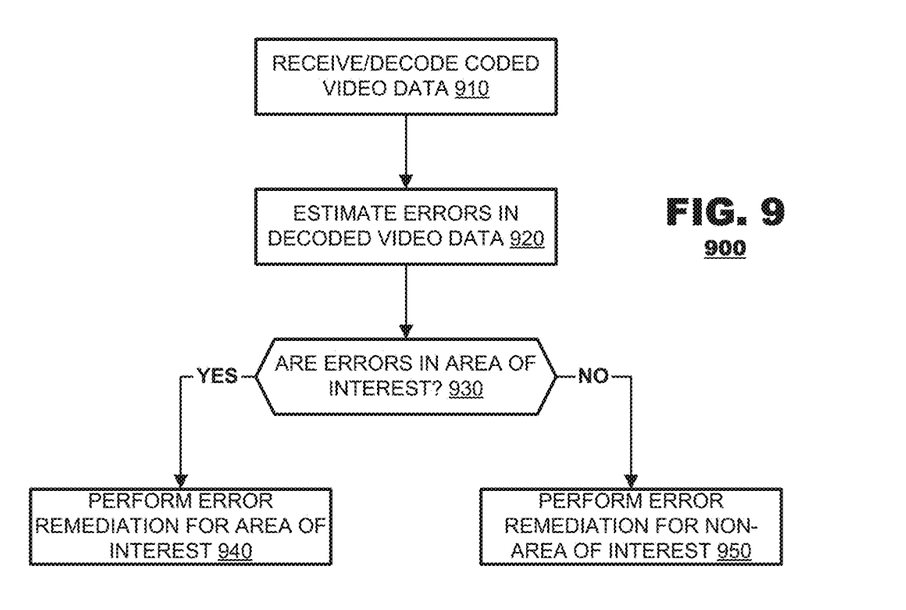
FIG. 9 illustrates a method according to another embodiment of the present invention.

FIG. 9 illustrates a method 900 according to an embodiment of the present invention. According to the method 900, a decoding terminal may receive and decode coded video data (box 910). As part of this operation, the method 900 may estimate the presence of errors in the decoded video data (box 920). The method 900 may estimate from metatdata identifying the location of an area of interest, whether the errors are present in a region occupied by an area of interest (box 930). If errors are present in the area of interest, the method 900 may engage in a first error remediation process (box 940) but, if not, the method 900 may engage in a second error remediation process (box 950) or may omit error remediation altogether (not shown).

The method 900 permits decoding terminals to apply error remediation differently to different content. For example, when errors that are present in an area of interest, the method 900 may perform more robust error concealment operations than when errors occur outside the area of interest. When errors occur outside the area of interest, the method 900 may not correct them at all or, alternatively, may simply import content from co-located areas of other, temporally proximate frames. When errors occur inside the area of interest, the method 900 may interpolate data from a plurality of temporally proximate frames, perhaps including motion estimation or object recognition. Alternatively, the method 900 may cause a decoding terminal to request retransmission of elements of the coded video stream to which the errors relate. Accordingly, the method 900 may spend additional resources attempting to recover from coding and/or transmission errors within an area of interest than would be spent on errors that are outside the area of interest.

The foregoing discussion has described operation of the embodiments of the present invention in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method, comprising:
   estimating depth of different elements within an image frame of video content,
   identifying, based on the estimated depths, a plurality of regions within the image frame, each having elements of a common depth,
   identifying an element of a region of the plurality of regions, the element having originated speech in audio content associated with the image frame,
   assigning the region having the identified element to be an area of interest,
   modifying the image frame by deleting the image content of at least one region of the identified plurality of regions within the image frame that is not an area of interest,
   coding the video content to include a coded representation of the modified image frame, and
   transmitting the coded video content to a channel.

2. The method of claim 1, wherein the deleting comprises replacing the image content from the region to be deleted with other content locally-stored in a terminal in which the method is performed.

3. The method of claim 1, wherein the plurality of regions is further identified by a face recognition process.

4. The method of claim 1, wherein the depth estimation is derived from an estimation of which elements in the video content are in focus and which elements are not.

5. The method of claim 1, wherein the depth estimation is derived from an infra-red ranging operation.

6. The method of claim 1, further comprising lowering a quantization parameter applied during coding of video content in the area of interest from a default quantization parameter applied to another region of the content.

7. A terminal, comprising:
   an image capture system,
   a video compositor to:
      receive video content from the image capture system,
      estimate depth of different elements within an image frame of video content,
      identify, based on the estimated depth, a plurality of regions within the an image frame, each having elements of a common depth,
      identify an element of a region of the plurality of regions, the element having originated speech in audio content associated with the image frame,
      assign the region having the identified element to be an area of interest, and
      modify the image frame by deleting the image content of at least one region of the identified plurality of regions within the image frame that is not an area of interest,
   a coding system to perform predictive coding operations on the video content from the video compositor to include a coded representation of the modified image frame, and
   a transmitter to transmit output from the coding system to a channel.

8. The terminal of claim 7, further comprising an infra-red transceiver, and the estimated depths of the different elements within the video content are estimated from ranging operations performed with the transceiver.

9. The terminal of claim 7, wherein the video compositor estimates depths of the different elements within the video content from analysis of the video content.

10. The terminal of claim 7, further comprising a memory to store image data that replaces the deleted portions of the image frame.

11. A non-transitory computer readable medium storing program instructions that, when executed by a processing device, causes the device to perform a method comprising:
    estimating depth of different elements within an image frame of video content,
    identifying, based on the estimated depth, a plurality of regions within the image frame, each having elements of a common depth,
    identifying an element of a region of the plurality of regions, the element having originated speech in audio content associated with the image frame,
    assigning the region having the identified element to be an area of interest,
    modifying the image frame by deleting the image content of at least one region of the identified plurality of regions within the image frame that is not an area of interest,
    coding the video content to include a coded representation of the modified image frame, and
    transmitting the coded video content to a channel.

12. The medium of claim 11, wherein the deleting comprises replacing image content from the region to be deleted with other content locally stored in a terminal in which the method is performed.

13. The medium of claim 11, wherein the plurality of regions is further identified by a face recognition process.

14. The medium of claim 11, wherein the depth estimation is derived from an estimation of which elements in the video content are in focus and which elements are not.

15. The medium of claim 11, wherein the depth estimation is derived from an infra-red ranging operation.

16. The medium of claim 11, wherein the coding applies a lowered quantization parameter for coding of video content in the area of interest as compared to quantization parameters applied to another region of the content.

17. A method comprising:
identifying, from a coded image frame of coded video data and based on estimated depths, a plurality of regions of the coded image frame, each having elements of a common depth,
identifying an element of a region of the plurality of regions within the coded image frame, the element representing an area of interest that originated speech in audio content associated with the coded image frame,
decoding the coded image frame for the region having the element representing the area of interest,
assembling image frame data from the decoded image frame of the area of interest and locally stored image data for a region outside the area of interest, and
rendering the assembled image frame.

18. A non-transitory computer readable medium storing program instructions that, when executed by a processing device, causes the device to perform a method comprising:
identifying, from a coded image frame of coded video data and based on estimated depths, a plurality of regions of the coded image frame, each having elements of a common depth,
identifying an element of a region of the plurality of regions within the coded image frame, the element representing an area of interest that originated speech in audio content associated with the coded image frame,
decoding the coded image frame for the region having the element representing the area of interest,
assembling image frame data from the decoded image frame of the area of interest and locally stored image data for a region outside the area of interest, and
rendering the assembled image frame.

19. A method, comprising:
estimating depth of different image frame elements of video content within audiovisual content,
categorizing image frame elements having similar estimated depths into common regions,
identifying an element of a region, the element having originated speech in an audio element of the audiovisual content,
assigning the region having the identified element to be a region of interest,
modifying the image frame by masking the image content of other regions within the image frame from the image content that are not regions of interest,
coding the video content to include a coded representation of the modified image frame, and
transmitting the coded video content to a channel.

20. A method, comprising:
estimating depth of different elements within an image frame of video content,
identifying, based on the estimated depths, a plurality of regions within the image frame, each having elements of a common depth,
identifying an element of a region of the plurality of regions, the element having originated speech in audio content associated with the image frame,
assigning the region having the identified element to be an area of interest,
modifying the image frame by masking the image content of at least one region of the identified plurality of regions within the image frame that is not an area of interest,
coding the video content to include coded representations of the region that is an area of interest and the at least one region that is masked, and
transmitting the coded video content to a channel.

* * * * *